United States Patent Office 3,276,882
Patented Oct. 4, 1966

3,276,882
HIGHLY HYDRATION STABLE SINTERS OF DOLO-
MITE, MAGNESITE, LIME OR THE LIKE
Friedrich Buntenbach, Marlene Buntenbach, and Kurt
Stautz, Hagen, Germany, assignors to Dolomitwerke
G.m.b.H., Wulfrath, Germany, a corporation of Germany
No Drawing. Filed Apr. 20, 1962, Ser. No. 188,983
Claims priority, application Germany, Apr. 22, 1961,
D 35,903
7 Claims. (Cl. 106—58)

This invention relates to highly hydration stable sintered materials from sinterable carbonates and preferably of dolomite, magnesite, calcite or mixtures thereon.

In accordance with conventional practice, sinters from certain types of carbonates, such as dolomite, magnesite, calcite or the like are obtained by calcining the material at relatively high temperatures which, depending upon the sintering capacity of the material, are between 1500 and 1800° C. If the material to be sintered contains relatively small amounts of components representable as $SiO_2$, $Al_2O_3$ and $Fe_2O_3$, these will aggregate at the particle surface of the material to be sintered when the same passes through the temperature range of from 900 to 1500° C. Such $SiO_2$, $Al_2O_3$ and $Fe_2O_3$ materials, or their equivalent, are, for instance, regularly present in relatively small amounts in naturally occurring dolomite. As these materials aggregate at the particle surface, they form within said temperature range of 900 to 1500° C. lime rich calcium silicate, -aluminate and -ferrite. These silicates, aluminates and ferrites formed at the particle surface of the material to be sintered are present, at the temperatures used, in the form of a melt, which coats the particle with a subtsantially non-porous melt skin. This coating can act stabilizing to the extent that it will protect free CaO and MgO from contact with water vapor containing atmosphere for such time until the water vapor has diffused through this layer. In this manner a sinter is obtained which is substantially hydration stable for a little while.

One object of the invention is the obtaining of a sinter of higher hydration stability. This and further objects of the invention will be apparent from the following decsription.

The invention is based upon the discovery that sintered material from sinterable carbonates, such as calcium carbonate, magnesium carbonate and calcium magnesium carbonate, of the type of calcite, magnesite and dolomite, and mixtures of said carbonates, may have the earth alkaline oxide, i.e. CaO and/or MgO present in a crystalline form with high internal crystal energy and in a crystalline form with low internal crystal energy, and that the high energy crystal form favors hydration, whereas the low energy crystal form prevents hydration. The high energy crystal forming is produced and exists at relatively high temperatures and is increasingly present the higher the temperature is above 1500° C. Conversion of the low energy to the high energy form takes place during the sintering at the sintering temperature. Upon cooling of the sintered material, in accordance with conventional sintering practices, the high energy crystal form of these oxides is carried over into the ultimate sintered product. It has now been found that relatively slow and gradual cooling from the highest sintering temperatures used will convert the high energy crystal form to low energy crystal form and that there is a specific "cooling temperature" at and below which the particular crystal form present remains substantially unchanged.

Generally the low energy crystal form can be recognized by a coarse crystalline form, i.e. by larger crystalline particles, whereas the high energy crystalline form is represented by a crystalline form, which consists of small crystalline particles. The desired crystalline form can be determined by observing a ground section of a specimen through a microscope.

Thus, in accordance with the invention, the sintered material from the above mentioned sinterable carbonates is obtained by subjecting the sintered product in which the oxides are normally present in the high energy crystal form to gradual cooling from a maximum temperature within the sintering range of between about 1500° C. and the melting point of such product to at least the temperature at and below which the then crystal form of the sintered product remains substantially unchanged, and extending said cooling for a period of time sufficient to convert high energy crystal form oxide to low energy crystal form to thereby obtain a sintered product of high hydration stability.

In the practical application of the invention, the material to be sintered is maintained for the requisite sintering time at a sintering temperature above 1500° C. and below the melting point of the material, and usually at a sintering temperature between about 1750 and 1850° C., whereupon the sintered material is gradually cooled for a given time interval from the highest sintering temperature used to its "cooling temperature." This "cooling temperature" is, in most cases, about 1500° C. It is, in accordance with the invention, of advantage to maintain the material to be sintered at its sintering temperature for at least 1 hour and preferably at least about 2 hours.

The cooling interval, in accordance with the invention, depends on the maximum sintering temperature and the higher the latter the longer may have to be the cooling time. Satisfactory results are ordinarily achieved with cooling periods of the order of at least about 2 hours and preferably of the order of 5 to 12 hours. An upper limitation is not necessary. The longer, however, the cooling interval, in accordance with the invention, extends the better will be the hydration stability, though in most cases a cooling time beyond 12 hours does not give appreciably better results. For practical purposes, therefore, and to obtain a sinter with an assured hydration stability, sufficient for most purposes, a cooling time of the order of from about 5 to 12 hours is preferred.

It is profitable to extend the cooling interval to the temperature, below which there is no essential change in the crystalline form, even though the material is subjected to this temperature for a while. This critical temperature can be determined by comparatively observing the ground sections of specimens through a microscope at different temperatures.

Instead of proceeding by first sintering a sinterable carbonate and gradually cooling the sintered product from its highest sintering temperature, in accordance with the invention, a sintered material, prepared in accordance with a conventional sintering method and having a low hydration stability, because of the high energy crystal form of its oxide, may be used as the starting material. The same is subjected to the treatment, in accordance with the invention, by heating it for a relatively short period of time to a sintering temperature within the above specified range and thereafter gradually cooling the sintered material from its highest temperature to the "cooling temperature," as hereinabove set forth.

The cooling interval, of course, depends on the particle size of the sintered material. Generally the particle size ranges from 0 to 25 mm.; it is also possible, to sinter larger grains, also in the range of 80 to 200 mm. Regarding these particle sizes, the cooling interval should be larger than this which is used for smaller particle sizes.

It is also possible, in accordance with the invention, to treat formed bodies of sintered material obtained, in accordance with conventional sintering methods, by heating the same to a temperature within the sintering range and thereafter subject the same to extended cooling, in accordance with the just described procedure.

The following examples are furnished by way of illustration, in each case Halden dolomite being used, it being understood, however, that in each of these examples any other dolomite, or any magnesite, or calcite, or mixtures of these minerals or any other sinterable Ca-, Mg-, CaMg-carbonate or their mixture may be substituted in the examples to obtain highly hydration stable sintered products. The material to be treated, in accordance with those examples, if other than dolomite, may contain components of the type and general amount representative of the $SiO_2$, $Al_2O_3$ and/or $Fe_2O_3$ impurities of most naturally occurring dolomites. Furthermore, in each of the below examples, the material to be sintered was ground or otherwise particled to a composition with ranges of particle size as these are well understood in the sintering art for the sintering of dolomite, magnesite, calcite, their mixtures or the like, and particularly as is conventional for the preparation of sintered formed bodies.

*Example 1a*

The Halden dolomite consists of about 98% of $CaCO_3 \cdot MgCO_3$. The rest of about 2% contains $SiO_2$, $Al_2O_3$ and $Fe_2O_3$. For the sintering process this material is used in a particle size of 5 to 25 mm.

The Halden dolomite is sintered in a sintering oven at about 1800° C. for about 2 hours, whereupon the sintered product is gradually cooled from this temperature to about 1500° C. during a time interval of about 5 hours, and then permitted to cool to room temperature. The sintered material thusly obtained was then subjected for about 10 hours to a saturated water vapor atmosphere at about 100° C. No hydration decomposition occurred. A slight hydration decomposition could be observed not until 40 hours, whereas a complete decomposition could not yet be stated after one week.

A rotary kiln is used as sintering apparatus which is heated by burning coal dust. The heated-gas-temperature in this kiln is maximumly 1900° C., whereas the temperature of the material is 1800° C. For the cooling process a shaft-shaped cooler is used which is regulated by slowly passing cooling air.

*Example 1b*

Using the same Halden dolomite material specified in Example 1a and produced in conventional manner by sintering the same at a temperature of about 1800° C. for a period of about 1 hour and permitting the product to cool relatively rapidly (less than 1 hour) to below 1200° C., a sinter product was obtained which, when subjected to the same testing conditions specified in Example 1a showed a slight hydration decomposition already after 10 minutes and a complete decomposition after 1 hour.

*Example 2*

A Halden dolomite derived sintered product obtained in the conventional manner, as set forth in Example 1b, was heated for 1 hour at 1800° C. and subsequently slowly cooled to 1500° C. within a time interval of about 5 hours, and thereafter permitted to cool to room temperature. The resulting sinter, when subjected to the testing conditions outlined in connection with Example 1a, was free from hydration decomposition when subjected for 10 hours at 100° C. to a saturated water vapor atmosphere.

*Example 3*

A Halden dolomite, as used in Example 1a, was sintered for 8 hours at a temperature of 1800° C., was thereafter gradually cooled to 1500° C. during a time interval of about 2 hours, and was then permitted to cool to room temperature. The dolomite was thus for 10 hours at a temperature above 1500° C. In subsequent testing, the sintered dolomite was subjected for 4 days to saturated water vapor atmosphere at a temperature of 100° C. No hydration decomposition occurred.

We claim:
1. In a process for the preparation of sintered material from a sinterable alkaline earth metal carbonate of the group consisting of calcium carbonate, magnesium carbonate, calcium magnesium carbonate and mixtures of said carbonates, in which the group member is sintered under conditions producing a high energy crystalline form alkaline earth metal oxide which has low hydration stability and which normally retains this form upon subsequent cooling, the improvement to convert this high energy crystalline form oxide to the low energy crystalline form thereof which has higher hydration stability, which comprises subjecting the sintered material to gradual cooling from a first temperature to a second temperature, said first temperature being within the range between 1500° C. and the melting point of said material, with said material melting point being above 1500° C. and said second temperature being defined as the temperature at and below which the crystalline form of the alkaline earth metal oxide remains substantially unchanged, said gradual cooling being extended for a period of time sufficient to convert the high energy crystalline form of such oxide resulting from sintering to the low energy crystalline form thereof to obtain a sintered product of high hydration stabilility.

2. The improvement according to claim 1 wherein after gradual cooling to the second temperautre, the sintered material is cooled to room temperature.

3. The improvement according to claim 1 in which said gradual cooling is extended over a period of at least two hours.

4. The improvement according to claim 1 in which said gradual cooling is extended over a period of at least five hours.

5. The improvement according to claim 1 in which the sinterable alkaline earth metal carbonate is dolomite, and in which the gradual cooling is extended over a period of at least two hours.

6. The improvement according to claim 1 wherein the sintered material subjected to gradual cooling constitutes a formed body of sintered material.

7. The improvement according to claim 1 wherein said first temperature is within the range between 1750° C. and 1850° C.

References Cited by the Examiner

UNITED STATES PATENTS

| 2,640,759 | 6/1953 | Hughey | 106—58 |
| 2,971,240 | 2/1961 | Renkey | 106—63 |

FOREIGN PATENTS

| 520,829 | 5/1940 | Great Britain. |

TOBIAS E. LEVOW, *Primary Examiner.*

JOHN H. MACK, *Examiner.*

J. POER, *Assistant Examiner.*